(12) United States Patent
Kass et al.

(10) Patent No.: US 8,345,004 B1
(45) Date of Patent: Jan. 1, 2013

(54) METHODS AND APPARATUS FOR DIFFERENTIALLY CONTROLLING DEGREES OF FREEDOM OF AN OBJECT

(75) Inventors: Michael Kass, Berkeley, CA (US); Warren Trezevant, Oakland, CA (US)

(73) Assignee: Pixar, Emeryville, CA (US)

( * ) Notice: Subject to any disclaimer, the term of this patent is extended or adjusted under 35 U.S.C. 154(b) by 619 days.

(21) Appl. No.: 12/509,196

(22) Filed: Jul. 24, 2009

Related U.S. Application Data (60) Provisional application No. 61/158,275, filed on Mar. 6, 2009.

(51) Int. Cl.
*G09G 5/08* (2006.01)
(52) U.S. Cl. ............ 345/161; 463/38; 463/37; 700/264; 345/163; 345/167; 345/184
(58) Field of Classification Search .................. 345/161, 345/163, 164, 167, 184; 463/37, 38; 700/245, 700/264, 85; 434/37, 38; 361/679.1, 679.18; 74/471 XY
See application file for complete search history.

(56) References Cited

U.S. PATENT DOCUMENTS

| | | | | |
|---|---|---|---|---|
| 6,377,256 B1 * | 4/2002 | Light et al. | ..................... | 345/419 |
| 6,507,773 B2 * | 1/2003 | Parker et al. | .................. | 700/258 |
| 7,221,999 B2 * | 5/2007 | Sano | .............................. | 700/254 |
| 7,463,001 B2 * | 12/2008 | Tsurukawa | .............. | 318/568.12 |
| 7,696,978 B2 * | 4/2010 | Mallett et al. | ................. | 345/156 |
| 8,041,455 B2 * | 10/2011 | Thorne | ......................... | 700/245 |
| 2003/0144774 A1 * | 7/2003 | Trissel et al. | .................... | 701/23 |
| 2008/0255704 A1 * | 10/2008 | Braut | ............................. | 700/264 |
| 2008/0281467 A1 * | 11/2008 | Pinter | ........................... | 700/245 |
| 2008/0281468 A1 * | 11/2008 | Jacobsen et al. | ............. | 700/246 |
| 2010/0174410 A1 * | 7/2010 | Greer et al. | ................... | 700/264 |

* cited by examiner

*Primary Examiner* — Lun-Yi Lao
*Assistant Examiner* — Tom Sheng
(74) *Attorney, Agent, or Firm* — Philip H. Albert; Kilpatrick Townsend & Stockton LLP (57) ABSTRACT

An input device for controlling an object includes a joystick and a modal switch. A user may use the modal switch to select a subset of degrees of freedom of the object. The joystick may then be used to control a change over time of the selected subset, where the change over time is functionally depend on both a motion of the joystick and a state of the selected subset. A method for controlling an object via the input device is also provided. The method includes receiving inputs indicating a selection by the modal switch of a subset of degrees of freedom of the object, and a motion of the joystick. A configuration of the selected subset is then caused to be changed based on the motion of the joystick and a state of the selected subset.

22 Claims, 8 Drawing Sheets

| | increase yaw | decrease yaw | increase pitch | decrease pitch | increase roll | decrease roll |
|---|---|---|---|---|---|---|
| up | increase left arm yaw [5] | decrease left arm yaw [5] | increase left arm pitch [5] | decrease left arm pitch [5] | increase left arm roll [2] | decrease left arm roll [2] |
| down | increase right arm yaw [5] | decrease right arm yaw [5] | increase right arm pitch [5] | decrease right arm pitch [5] | increase right arm roll [2] | decrease right arm roll [2] |

METHODS AND APPARATUS FOR DIFFERENTIALLY CONTROLLING DEGREES OF FREEDOM OF AN OBJECT

CROSS-REFERENCES TO RELATED APPLICATIONS

This application claims priority to U.S. Provisional Patent Application No. 61/158,275, filed on Mar. 6, 2009, which is incorporated herein for all purposes.

TECHNICAL FIELD

The present invention relates to control of graphics/animation and objects such as robots. More specifically, the present invention relates to an input device such as a joystick including a modal switch for selecting a subset of degrees of freedom of an object to be controlled by the joystick.

BACKGROUND

Joysticks are typically provided as a type of input device used to control an object, such as a robot or a virtual character. In the field of controlling objects having a plurality of parts, such as arms, legs, a head, etc., challenges arise when attempting to efficiently control, by a single user, all of the parts of the object. In known input devices in the field of animation systems, a single input device controls only a single degree of freedom of an object. For example, a single mouse or a single joystick controls a single degree of freedom of a virtual character. Accordingly, current input devices are deficient in that they are unable to control different degrees of freedom or switch between different degrees of freedom to be controlled and thus are unable to efficiently and accurately control a plurality of parts of an object.

When controlling objects having a plurality of parts, movement of an input device such as a joystick in a single direction typically results in movement of a single part of an object in a single direction. For example, movement of a joystick in a forward direction results in movement of a left leg in a forward direction. In such a case, it may be impossible for a single user to control all or even most of the parts of the object. Accordingly, current input devices are deficient in that a single user is extremely limited in the number of parts of the object he or she may control simultaneously.

Accordingly, what is desired are improved methods and apparatus for solving some of the problems discussed above. Additionally, what is desired are improved methods and apparatus for reducing some of the drawbacks discussed above.

SUMMARY

An input device for controlling an object includes a joystick and a modal switch. The object may be, for example, a robot having a plurality of degrees of freedom, such as a roll of an arm, a pitch of an arm, a color of a face, a texture of a chest, etc. The modal switch functions to select a subset of degrees of freedom of the object. For example, the modal switch may be activated to select a roll of a left arm and a yaw of a left arm. In another example, the modal switch may be activated to select a roll and yaw of a right arm. The joystick functions to control change over time in a configuration of the selected subset. For example, the joystick may be used to control a change in the roll of the left arm and/or to control a change in the yaw of the left arm. The change in the configuration of the selected subset is functionally dependent on both a motion of the joystick and a state of the subset. For example, increasing a yaw of the joystick may cause a corresponding increase in the yaw of the left arm, where the yaw of the left arm is increased from a yaw of the left arm prior to control by the joystick.

In a method for controlling an object via an input device, a computer processor receives first and second inputs from an input device. The input device includes a joystick and a modal switch. The first input indicates a selection by the modal switch of a subset of degrees of freedom of an object. For example, the first input may be used to select a roll of a left arm and a yaw of a left arm. The second input indicates a motion of the joystick. For example, the second input may be used to control a change in the roll of the left arm and/or to control a change in the yaw of the left arm. The computer processor causes a change over time in a configuration of the selected subset based on the motion of the joystick and a state of the selected subset. For example, increasing a yaw of the joystick may cause a corresponding increase in the yaw of the left arm, where the yaw of the left arm is increased from a yaw of the left arm prior to control by the joystick.

These and other advantages of the invention will be apparent to those of ordinary skill in the art by reference to the following detailed description and the accompanying drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Figure 1:
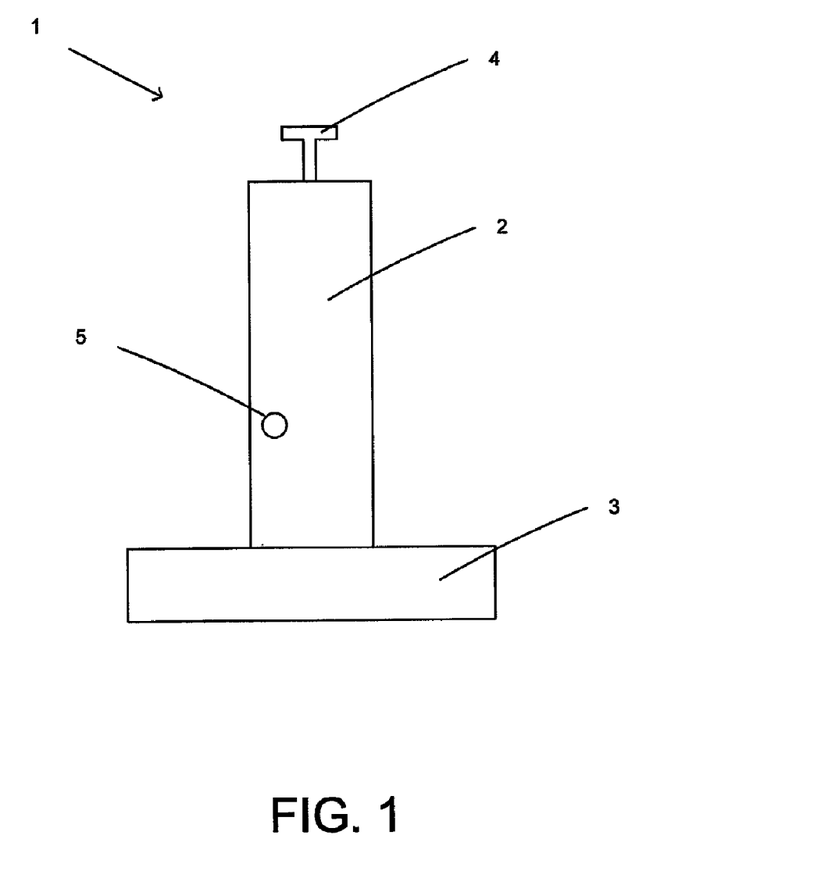
FIG. 1 illustrates an input device including a joystick and a modal switch provided on the joystick.

FIG. 1 illustrates an input device 1 according to an embodiment of the present invention. The input device 1 includes a user-manipulable joystick 2 movably supported on a housing 3. The joystick 2 is typically supported on a gimbal mechanism, although other supports and connections between the joystick 2 and the housing 3 as known in the art are possible. The joystick 2 may have one or more degrees of freedom. In one embodiment, the joystick 2 has three or more degrees of freedom. In another embodiment, the joystick 2 has five degrees of freedom. A set of position sensors or transducers is provided for each degree of freedom, as known in the art, for detecting motion of the joystick 2.

The input device 1 also includes a modal switch 4 provided on the joystick 2. The modal switch 4 may have one or more degrees of freedom. In one embodiment, the modal switch 4 is a "top hat" type switch mounted on a top surface of the joystick 2 and has two degrees of freedom. The motion of the modal switch 4 is independent of the motion of the joystick 2. In another embodiment, the modal switch 4 has five positions, including a forward position, a backward position, a left position, a right position, and a central position. The modal switch 4 may be spring-activated such that after a user pushes the modal switch 4 into either the forward, backward, left or right position, the modal switch 4 returns to the central position when the user releases the modal switch 4. The input device 1 may also include a "dead man" switch 5 as discussed below.

The modal switch 4 need not be a top hat. Rather, the modal switch 4 may be any type of switch that provides an indication of one of a plurality of inputs. For example, the modal switch 4 may be a slide switch or an ON/OFF button. It may also be a plurality and/or combination of slide switches and ON/OFF buttons.

The modal switch 4 need not be mounted on the top surface of the joystick 2. Rather, the modal switch 4 may be located elsewhere. In one embodiment, the modal switch 4 is located on an entirely different device than input device 1. In another embodiment, the modal switch 4 is located anywhere in the vicinity of the joystick 2 such that the user can access the modal switch 4 using the same controller (such as a hand) as is used to manipulate the joystick 2 without detrimentally affecting control of the joystick 2. For example, the modal switch 4 may be located on a side surface of the joystick 2 or on the housing 3.

FIGS. 2(a)-(d) illustrate the control of an object 6 via the input device 1 according to embodiments of the present invention. The object 6 may be a physical animatronic robot or a virtual character. The input device 1 functions to control the object 6 by sending control signals to the object 6 or to a computing device including a display on which the object 6 may be viewed. The object 6 includes a plurality of degrees of freedom; one or more of the plurality of degrees of freedom may be controlled by the input device 1. When the object 6 corresponds to a body, the plurality of degrees of freedom may correspond to motions of parts of the body. For example, the degrees of freedom may correspond to any of a yaw of an arm, a pitch of an arm, a roll of arm, a yaw of a leg, a pitch of a leg, a roll of a leg, etc. The plurality of degrees of freedom may also correspond to a change in other characteristics of the object 6. for example, the degrees of freedom may correspond to any of a color of a face, a color of an arm, a color a chest, a texture of a face, a texture of an arm, a texture of a chest, etc.

The modal switch 4 functions to select a subset of the degrees of freedom of the object 6. For example, the subset may include only a yaw of a left arm; alternatively, the subset may include a yaw of a left arm, a pitch of a left arm, and a roll of a left arm. The modal switch 4 may select a subset of the degrees of freedom of the object 6 by communicating an indication of one a plurality of inputs to the object 6 or to a computing device including a display on which the object 6 may be viewed. Each of the plurality of inputs may correspond to one or more degrees of freedom of the object 6. The joystick 2 functions to control a change over time in a configuration of the selected subset. For example, the joystick 2 may control the yaw of the left arm to increase or decrease over time; in other words, the joystick 2 may control an angle of the yaw of the left arm with respect to a predetermined reference point to increase or decrease over time. Providing the modal switch 4 on or in the vicinity of the joystick 2 advantageously enables a user to simultaneously select a subset of the degrees of freedom of the object 6 to be controlled and control the selected subset with the use of a single hand. As such, the user's other hand is available for other activities, such as controlling degrees of freedom of the object 6 not associated with the input device 1.

Figure 2A:
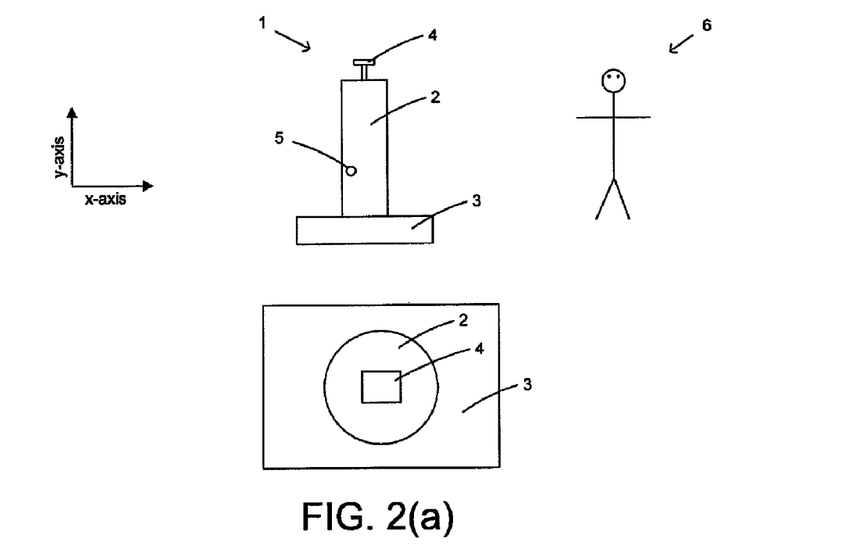
FIGS. 2(a)-(d) include top and side views of an input device illustrating the control of an object via the input device.

FIG. 2(a) illustrates an input device 1 and an object 6 before a user begins to control degrees of freedom of the object 6. Both a side view of the input device 1 and a top view of the input device 1 are shown. In this case, the modal switch 4 is at rest in a center position, and the center position does not correspond to any degrees of freedom of the object 6. In an alternative embodiment, the center position may correspond to one or more degrees of freedom of the object 6.

Figure 2B:
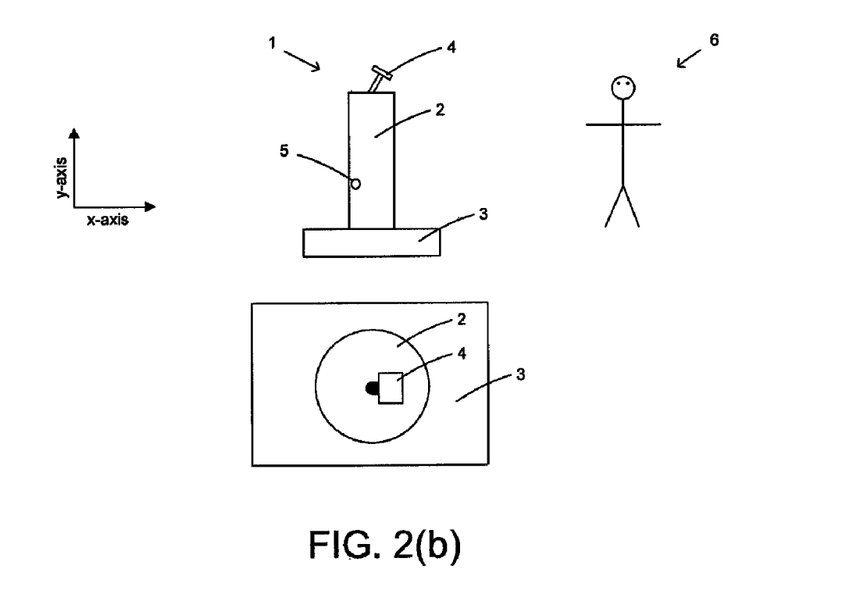

FIG. 2(b) illustrates user-activation of the modal switch 4 by placing the modal switch 4 in one of a plurality of predetermined positions. In the example shown, a right position of the modal switch 4 corresponds to a subset of degrees of freedom of the object 6 including a pitch of a left arm of the object 6. Accordingly, by placing the modal switch 4 in the right position, the user is able to select a pitch of a left arm of the object 6 to subsequently control via the joystick 2. As further described below, the subset corresponding to the right position of the modal switch 4 may also include a yaw of the left arm and a roll of the left arm, thus allowing the joystick 2 to control a plurality of degrees of freedom of the object 6.

Figure 2C:
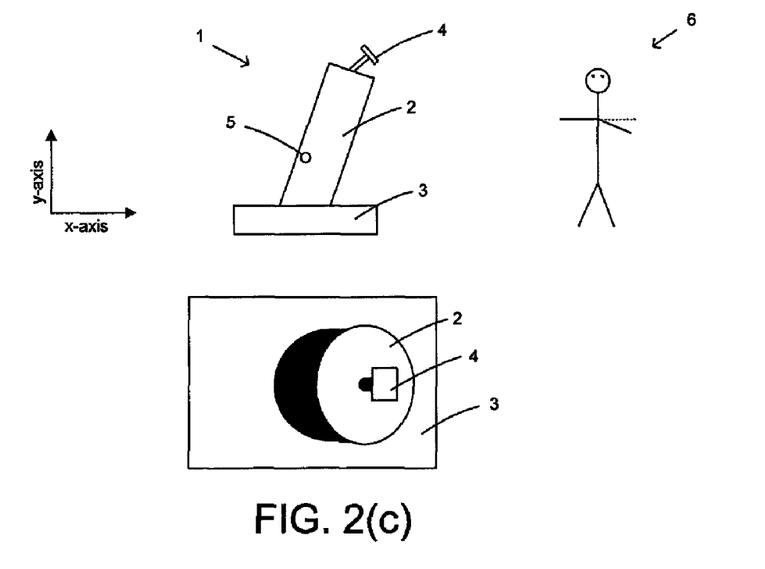

FIG. 2(c) illustrates a change in one of a plurality of degrees of freedom of the joystick 2. Each degree of freedom of the joystick 2 may correspond to one or more degrees of freedom of the object 6. A change in the degree of freedom of the joystick 2, such as that caused by a motion of the joystick 2, causes a change in one or more degrees of freedom of the object 6. In this example, rolling the joystick 2 along the positive x-axis while the modal switch 4 is in the right position causes a decrease in a pitch of the left arm along the negative y-axis. Here, a dotted line in the object 6 illustrates the position of the left arm prior to movement of the joystick 2.

Figure 2D:
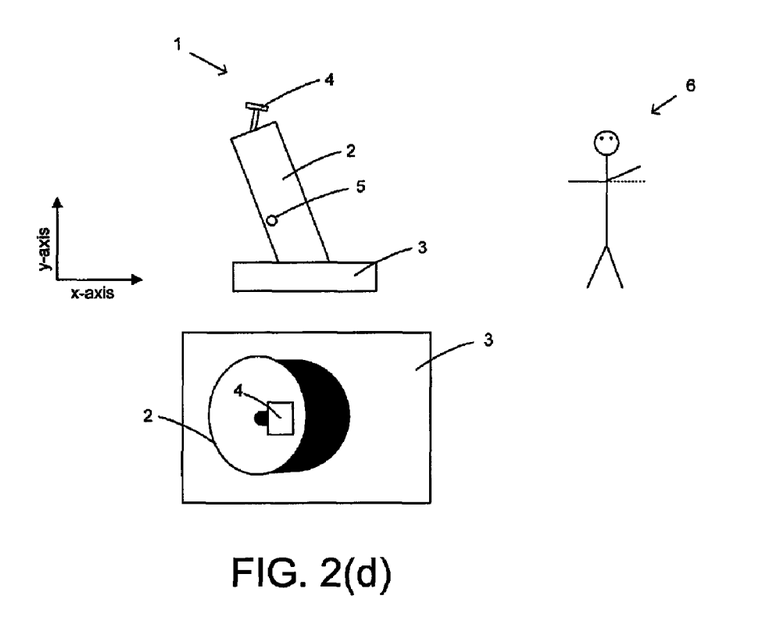

FIG. 2(d) illustrates another change in one of a plurality of degrees of freedom of the joystick 2. In this example, rolling the joystick 2 along the negative x-axis while the modal switch 4 is in the right position causes an increase in a pitch of the left arm. Similar to FIG. 2(c), a dotted line in the object 6 illustrates the position of the left arm prior to displacement of the joystick 2.

In accordance with embodiments of the present invention, an amount of change of one or more degrees of freedom of the object 6 is controlled by an amount of displacement of a degree of freedom of the joystick 2. For example, causing one of the degrees of freedom of the joystick 2 to be displaced a first angle or distance results in a first amount of change of a selected degree of freedom of the object 6. Once the selected degree of freedom of the object 6 has been changed by the first amount, the degree of freedom will stop changing. Causing the degree of freedom of the joystick 2 to then be displaced in the same direction a second angle or distance causes the selected degree of freedom of the object 6 to begin changing again and be displaced a second amount. In other words, displacement of a degree of freedom of the joystick 2 controls an absolute change of the selected degree of freedom of the object 6.

In accordance with embodiments of the present invention, a rate of change of one or more degrees of freedom of the object 6 is controlled by an amount of displacement of a degree of freedom of the joystick 2. For example, causing one of the degrees of freedom of the joystick 2 to be displaced a first angle or distance results in a first rate of change of a selected degree of freedom of the object 6. Causing the degree of freedom of the joystick 2 to be displaced in the same direction a second distance, which is greater than the first distance, results in a second rate of change of the selected degree of freedom of the object 6 that is greater than the first rate. Accordingly, the rate of change of a selected degree of freedom of the object 6 increases proportional to the amount of displacement of a degree of freedom of the joystick 2 from its state of rest. In other words, displacement of a degree of freedom of the joystick 2 controls a rate of change of a selected degree of freedom of the object 6.

Other techniques for controlling an object 6 via a joystick 2 as known in the art are possible. For example, for each degree of freedom of the joystick 2, the joystick 2 may simply communicate an ON signal to the object 6 once a threshold displacement is reached. If the threshold displacement is not reached, an OFF signal is communicated. When the joystick 2 communicates the ON signal, the selected degree of freedom of the object 6 is changed either a predetermined amount or an amount based on the duration of the ON signal. Alternatively, when the joystick 2 communicates the ON signal, the selected degree of freedom of the object 6 is changed at either a predetermined rate or a rate based on the duration of the ON signal. When the OFF signal is communicated, the selected degree of freedom of the object 6 is not changed.

The modal switch 4 need not function to select only one of the degrees of freedom of the object 6. Rather, the modal switch 4 may function to simultaneously select a plurality of degrees of freedom of the object 6. In this case, a selected position of the modal switch 4 corresponds to a plurality of degrees of freedom of the object 6. For example, a selected position may correspond to both a yaw and roll of a left arm. Additionally or alternatively, a selected position may correspond to both a yaw of a left leg and a yaw of a right leg.

Each degree of freedom of the joystick 2 may correspond to each degree of freedom in a subset of degrees of freedom of the object 6. For example, a change in a yaw of the joystick 2 may cause a change in yaw of a left arm of the object 6 while a change in a roll of the joystick 2 may cause a change in roll of the left arm of the object 6. Additionally or alternatively, a change in a yaw of the joystick 2 may cause a change in a yaw of a left arm of the object 6 while a change in a roll of the joystick may cause a change in a yaw of a right arm of the object 6.

Each degree of freedom of the joystick 2 may correspond to a plurality of degrees of freedom of the object 6. For example, changing a degree of freedom of the joystick 2 may cause a change in two or more degrees of freedom of the object 6. A change in a degree of freedom of the joystick 2 may cause identical changes to a plurality of degrees of freedom of the object 6. For example, rolling the joystick 2 along the positive x-axis while the modal switch 4 is in the right position may cause a pitch of both the left arm and right arm of the object 6 to decrease. Alternatively, a change in a degree of freedom of the joystick 2 may cause different changes to a plurality of degrees of freedom of the object 6. For example, rolling the joystick 2 along the positive x-axis while the modal switch 4 is in the right position may cause a pitch of the left arm of the object 6 to decrease and a pitch of the right arm of the object 6 to increase. In any case, a rate or amount of change for each degree of freedom of the object 6 compared to the displacement of the degree of freedom of the joystick 2 may be the same or may be different.

A gain may be applied to a change in a degree of freedom of the joystick 2 so that a change in one or more degrees of freedom of the object 6 is greater than, equal to, or less than the change in the degree of freedom of the joystick 2. The gain may be greater than one, equal to one, or less than one. The gain may be predetermined or calculated. For example, when the modal switch 4 is in the right position and a roll of the joystick 2 controls a pitch of a left arm of the object 6, a gain of 5 may be applied so that an N-degree change in the roll of the joystick 2 causes a (5×N-degree) change in the pitch of the left arm of the object 6. In another example, when the modal switch 4 is in the right position and a roll of the joystick 2 controls a pitch of a left arm of the object 6, a gain of 0.5 may be applied so that an N-degree change in the roll of the joystick 2 causes a (0.5×N-degree) change in the pitch of the left arm of the object 6.

Each degree of freedom of the object 6 may have associated therewith a boundary condition indicating a maximum absolute change of the degree of freedom of the object 6. In this case, the boundary condition may be a limitation in a single-dimensional space. When the degree of freedom of the object 6 reaches a predetermined distance from or proximity to the boundary condition, a gain applied to the change of the degree of freedom of the object 6 may be reduced. The gain applied to the change of the degree of freedom of the object 6 may be reduced to zero when the degree of freedom of the object 6 reaches the boundary condition. The reduction of the gain may be linear, exponential, or the like. The gain may be reduced even if a displacement of the degree of freedom of the joystick 2 is increased.

For example, there may be boundary condition on a maximum or minimum pitch of the left arm of the object 6. If the joystick 2 is moved to cause a change in the pitch of the left arm of the object 6, when the pitch reaches the predetermined distance from or proximity to the boundary condition a gain applied to the pitch of the left arm of the object is changed to reduce the rate of change of the pitch. The gain may be changed to reduce the rate of change of the pitch to zero as the pitch of the left arm of the object 6 reaches the boundary condition.

In a similar, but opposite fashion, a gain applied to a change of degree of freedom of the object 6 may increase as the degree of freedom moves further away from the boundary condition toward the predetermined distance or proximity to the boundary condition. The increase may be linear, exponential, or the like.

A plurality of degrees of freedom of the object 6 may have associated therewith a boundary condition indicating a maximum absolute change for all of the plurality of degrees of freedom of the object 6. In this case, the boundary condition may be limitation in a multi-dimensional space. When any of the plurality of degrees of freedom of the object 6 reach a predetermined distance from or proximity to the boundary condition, a gain applied to the change of the degree of freedom of the object 6 may be reduced. The boundary condition may change based on the configuration of the plurality of degrees of freedom of the object 6. The gain applied to the change of the degree of freedom of the object 6 may be reduced to zero when the degree of freedom of the object 6 reaches the boundary condition. The reduction of the gain may be linear, exponential, or the like. The gain may be reduced even if a displacement of the degree of freedom of the joystick 2 is increased.

For example, for a given configuration of a plurality of degrees of freedom of the object 6, in other words, when the plurality of degrees of freedom are in predetermined positions, there may be a boundary condition on a maximum or minimum pitch of the left arm of the object 6. If the joystick 2 is moved to cause a change in the pitch of the left arm of the object 6, when the pitch reaches the predetermined distance from or proximity to the boundary condition a gain applied to the pitch of the left arm of the object is changed to reduce the rate of change of the pitch. The gain may be changed to reduce the rate of change of the pitch to zero as the pitch reaches the boundary condition. As the configuration of the plurality of degrees of freedom of the object 6 changes, the boundary condition on the maximum or minimum pitch of the left arm of the object 6 may also change.

The boundary condition may be detected. Sensors may be provided on the object 6 or in the vicinity of the object 6 for detecting objects other than the object 6. Objects other than the object 6 may include real or animated walls, floors, people, etc. A distance from the object 6 to the objects other than the object 6 may be defined as the boundary condition. The boundary condition may be calculated. The size, location, dimensions, etc., of the parts of the object 6 may be pre-stored and used to calculate a boundary condition. Additionally or alternatively, a configuration of the degrees of freedom of the object 6 may be used to calculate a boundary condition.

In the case that each degree of freedom of the joystick 2 corresponds to a plurality of degrees of freedom of the object 6, the plurality of degrees of freedom of the object 6 need not move at the same rate of change. Rather, one degree of freedom of the object 6 may move at a rate based on the amount of displacement of the joystick 2, and another degree of freedom of the object 6 may move at a reduced rate. The rate may be reduced due to the proximity of the degrees of freedom of the object 6 to a boundary condition. For example, rolling the joystick 2 along the positive x-axis while the modal switch 4 is in the right position may cause a pitch of both the left arm and right arm of the object 6 to decrease. Prior to the joystick 2 being displaced, if the left arm is within a predetermined distance from or proximity to a boundary constraint and the right arm is not, then when a user rolls the joystick 2 along the positive x-axis while the modal switch 4 is in the right position the rate at which the pitch of the left arm changes decreases whereas the rate at which the pitch of the right arm changes does not decrease.

In addition to being based on a motion of the joystick 2, a change in configuration of a selected subset of degrees of freedom of an object 6 may also be based on a state of the selected subset. In other words, a change applied to a degree of freedom of the object 6 from the joystick 2 may be applied to a current configuration of the degree of freedom of the object 6. A current configuration of the degree of freedom of the object 6 refer to a position of the degree of freedom of the object 6 before the motion from the joystick 2 is applied. For example, a user may place the modal switch 4 in an appropriate position to control a pitch of a left arm of the object 6. The user may then cause the left arm to be moved from a first position to a second position different than the first position. The user may then place the modal switch 4 in an appropriate position to control a pitch of a right arm of the object 6. When the user moves the modal switch 4 from the appropriate position to control the pitch of the left arm, the pitch of the left arm stays in the second position. After subsequently controlling the pitch of the right arm, the user may place the modal switch 4 back into the appropriate position to control the pitch of the left arm. The user may then cause the left arm to be moved from the second position. In this case, the second position is the current configuration of the part. Advantageously, a user may thus control a degree of freedom of the object 6 without having the degree of freedom return to a predetermined configuration before control of the degree of freedom is resumed by the user. This is referred to as differential control.

Alternatively, a change applied to a degree of freedom of the object 6 from the joystick 2 may not be applied to a current configuration of the degree of freedom; rather, a change may be applied to an original configuration of the degree of freedom. For example, a user may place the modal switch 4 in an appropriate position to control a pitch of a left arm of the object 6. The user may then cause the left arm to be moved from a first position to a second position different than the first position. The user may then place the modal switch 4 in an appropriate position to control a pitch of a right arm of the object 6. When the user moves the modal switch 4 from the appropriate position to control the pitch of the left arm, the left arm automatically returns to the first position. After subsequently controlling the pitch of the right arm, the user may place the modal switch 4 back into the appropriate position to control the pitch of the left arm. The user may then cause the left arm to be moved from the first position. In this case, the first position is the original configuration. This is referred to as absolute control.

In some embodiments, a dead man switch 5 may be provided on or in the vicinity of the joystick 2. Activation of the dead man switch 5 may cause all gains applied to changes in degrees of freedom of the joystick 2 to equal zero. Deactivation of the dead man switch 5 may cause all gains applied to changes in the degrees of freedom 2 to return to their value prior to activation of the dead man switch 5. Accordingly, a user may control an object 6 while the dead man switch 5 is deactivated. When the user has reached physical and/or spatial constraints of the input device 1, the user may activate the dead man switch 5 and subsequently reconfigure the input device 1 so that it is not constrained. The user may then deactivate the dead man switch 5 and once again control the object 6.

In one embodiment, the dead man switch 5 may be activated by pressing and holding in a switch on or in the vicinity of the joystick 2. Accordingly, in this embodiment, the dead man switch 5 may be deactivated by releasing the switch. In another embodiment, the dead man switch 5 may be activated while a switch on or in the vicinity of the joystick 2 is not depressed. Accordingly, in this embodiment, the dead man switch 5 may be deactivated by pressing and holding in the switch.

In some embodiments, the joystick 2 may cause additional change to a selected degree of freedom of the object 6 that is already changing. The additional change may increase or decrease a rate of change of the selected degree of freedom. For example, due to pre-programming, additional programming, or alternative programming, a pitch of a left leg of the object 6 may be increasing without the user displacing the joystick 2. When the user places the modal switch 4 in an appropriate position to control the pitch of the left leg, any displacement of the left leg caused by displacing the joystick 2 is added to the existing motion of the left leg. Accordingly, a user may speed up or slow down an existing change in a degree of freedom of the object 6.

In some embodiments, a degree of freedom of the object 6 may be controlled by motion of the joystick 2 while another degree of freedom of the object 6 is changing due to pre-programming, additional programming, or alternative programming. For example, due to pre-programming, additional programming, or alternative programming, a pitch of a left arm of the object 6 may be increasing or decreasing. When the user places the modal switch 4 in an appropriate position to control a yaw of the left arm of the object 6, any change in yaw of the left arm caused by displacement of the joystick 2 occurs simultaneously with the existing change in the pitch of the left arm.

Figure 3:
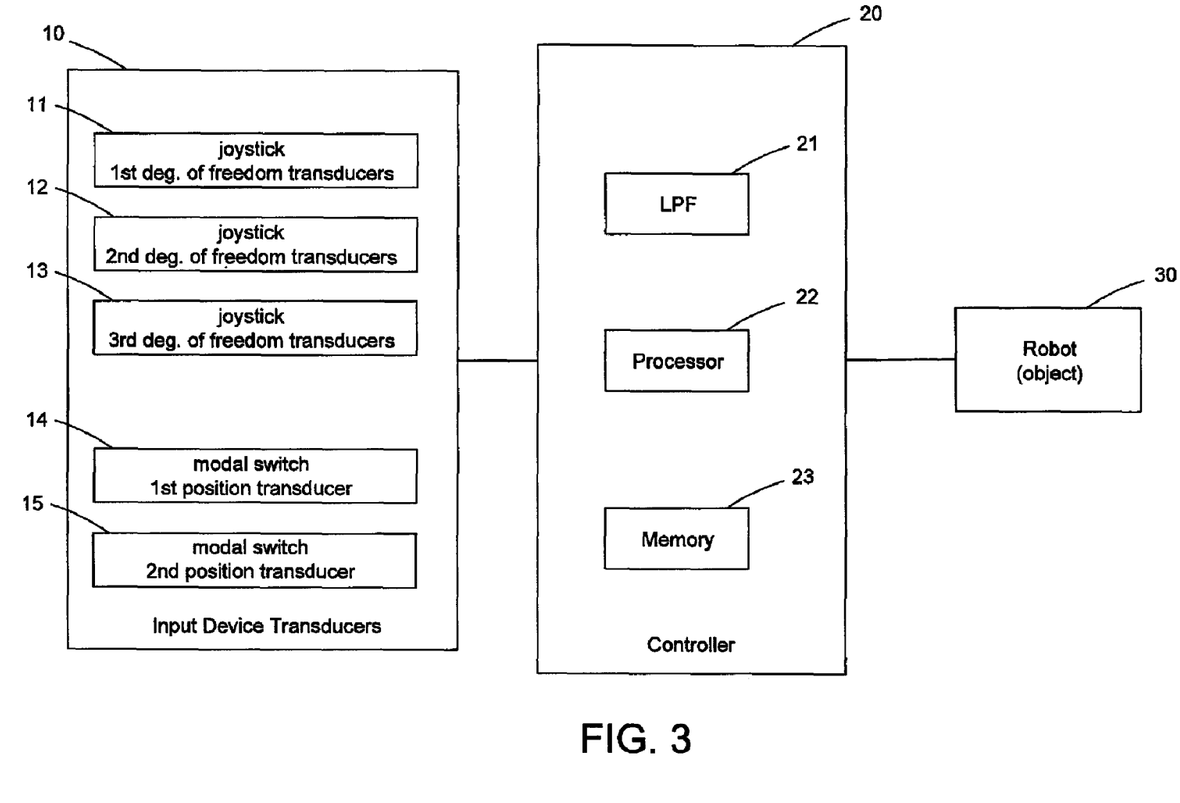
FIG. 3 illustrates a control system for controlling an object via input device transducers.

FIG. 3 illustrates a control system according to embodiments of the present invention. FIG. 3 is merely illustrative of an embodiment incorporating the present invention and does not limit the scope of the invention as recited in the claims. One of ordinary skill in the art would recognize other variations, modifications, and alternatives. The control system includes input device transducers 10, a controller 20, and a robot 30 to be controlled. The robot 30 is an object. The robot 30 may be a physical animatronic robot. Alternatively, the robot 30 may be a virtual character. In the case where the robot 30 is a virtual character, the controller 20 communicates with a host computer that runs software for displaying the virtual character on, for example, an LED display. Throughout the remainder of this specification, although a robot 30 is described, it should be understood that the robot 30, object, and virtual character are interchangeable.

The input device transducers 10 may be provided in or on the input device 1. The input device transducers 10 function to receive inputs from the user via the input device 1 and communicate the received inputs to the controller 20. The inputs may be communicated by wired or wireless communications as is known in the art. The controller 20 may be provided in or on the input device 1. The controller 20 may also be provided separate from the input device 1. For example, the controller 20 may be provided as a stand-alone unit or provided in or on the host computer or robot 30. The controller 20 communicates control signals to the robot 30. The control signals may be communicated to the robot 30 either by wired or wireless communications as is known in the art.

The input device transducers 10 may include a pair of transducers for each degree of freedom of the joystick 2. Each pair of these transducers functions to measure an amount of displacement of the joystick 2 and/or an amount of time that the joystick 2 is displaced for the corresponding degree of freedom and to communicate the measurement to the controller 20. In some embodiments, the joystick 2 has three degrees of freedom. Accordingly, the input device transducers 10 include joystick first degree of freedom transducers 11 for measuring displacement of the joystick 2 for the first degree of freedom and communicating the measurement to the controller 20, joystick second degree of freedom transducers 12 for measuring displacement of the joystick 2 for the second degree of freedom and communicating the measurement to the controller 20, and joystick third degree of freedom transducers 13 for measuring displacement of the joystick 2 for the third degree of freedom and communicating the measurement to the controller 20.

The input device transducers 10 may also include a transducer for each of the plurality of positions of the modal switch 4. Each of these transducers functions to recognize a user activation of one of the plurality of positions of the modal switch 4 and communicate the activation to the controller 20. In some embodiments, the modal switch 4 has two positions. Accordingly, the input device transducers 10 include a modal switch first position transducer 14 for recognizing a user activation of the first position and communicating the activation to the controller 20, and a modal switch second position transducer 15 for recognizing a user activation of the second position and communicating the activation to the controller 20.

The controller 20 includes a processor 22 and a storage device 23. The storage device 23 may store a map that includes, for each position of the modal switch 4, a relationship between changes to degrees of freedom of the joystick 2 and changes in a configuration of a selected subset of degrees of freedom of the object 6. The map may also include gain factors for mapping a displacement of the joystick 2 to a rate or amount of change of a degree of freedom of the object 6. The mapped relationship and gain factors may be included in the same map or in different maps. The processor 22 uses the map(s) to determine the degree of freedom of the object 6 to be changed via the input device 1 and to determine how the degree of freedom of the object 6 is to be changed. The processor 22 may also use the map(s) to determine the rate or amount of change of a degree of freedom of the object 6.

The storage device 23 may also store information concerning the robot 30. The information may include boundary conditions and predetermined distances from the boundary conditions for one or all of the degrees of freedom of the robot 30. The information may also include configuration information of each of the parts of the robot 30 and/or each of the degrees of freedom of the robot 30. The configuration information may include an original configuration and/or a current configuration of each part and/or degree of freedom of the robot 30. The configuration information may include current rates of change of each part and/or degree of freedom of the robot 30. The controller 20 may retrieve the configuration information from the robot 30. The configuration information may be retrieved at regular intervals or after receiving information from the input device transducers 10. Alternatively, the robot 30 may provide the configuration information to the controller 20. The configuration information may be provided at regular intervals or after changes in degree of freedom and/or a position of a part of the robot 30.

The storage device 23 may also store data such as image files, models including geometrical descriptions of objects, ordered geometric descriptions of objects, procedural descriptions of models, scene descriptor files, shader code, a rendering engine, executable computer code, human readable code, or the like. The storage device 23 may be one or more floppy disks, removable hard disks, optical storage media such as CD-ROMs, DVDs and bar codes, semiconductor memories such as flash memories, read-only-memories (ROMS), battery-backed volatile memories, networked storage devices, and the like.

The controller 20 may also include a low pass filter 21 for filtering the information received from the joystick transducers. The output from the joystick transducers may be noisy. Accordingly, the low pass filter 21 functions to reduce the noise by smoothing the transducer results over time. The characteristics of the low pass filter 21 can be chosen as known in the art to reduce the noise without filtering out the detected motion of the joystick 2.

Although not illustrated, the controller 20 and robot 30 may include computer interfaces to facilitate communication between the controller 20 and robot 30. Embodiments of computer interfaces typically include an Ethernet card, a modem (telephone, satellite, cable, ISDN), (asynchronous) digital subscriber line (DSL) unit, FireWire interface, USB interface, and the like. For example, computer interfaces may be coupled to a computer network, to a FireWire bus, or the like. In other embodiments, computer interfaces may be physically integrated on a motherboard of the controller 20 and/or robot 30, and may be a software program, such as soft DSL, or the like. The input device 1 may also include similar computer interfaces to facilitate communication between the input device 1 and the controller 20 and/or robot 30.

Although not illustrated, the controller may include a system bus for facilitating communication between the elements of the controller 20. For example, the system bus may facilitate communication between the low pass filter 21, processor 22, and/or storage device 23.

In some embodiments, the processor 22 is one or more Xeon microprocessors from Intel. Further, in some embodiments, the processor 22 executes a UNIX-based operating system stored in the storage device 23.

In various embodiments, the controller 20 may also include software that enables communications over a network such as the HTTP, TCP/IP, RTP/RTSP protocols, and the like. In alternative embodiments of the present invention, other communications software and transfer protocols may also be used, for example IPX, UDP or the like.

Although not illustrated, in some embodiments, the controller 20 may include a graphics processing unit (GPU) that may be user programmable. Such GPUs are available from NVIDIA, ATI, and other vendors. The GPU may include a graphics processor, a number of memories and/or registers, and a number of frame buffers. The GPU may be configured to output, to a display, the virtual character.

The controller in FIG. 3 is representative of a controller capable of embodying the present invention. It will be readily apparent to one of ordinary skill in the art that many other hardware and software configurations are suitable for use with the present invention. For example, the controller may be part of a desktop, portable, rack-mounted or tablet computer configuration. Additionally, the controller may be one of a series of controllers. Further, the use of other processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 4:
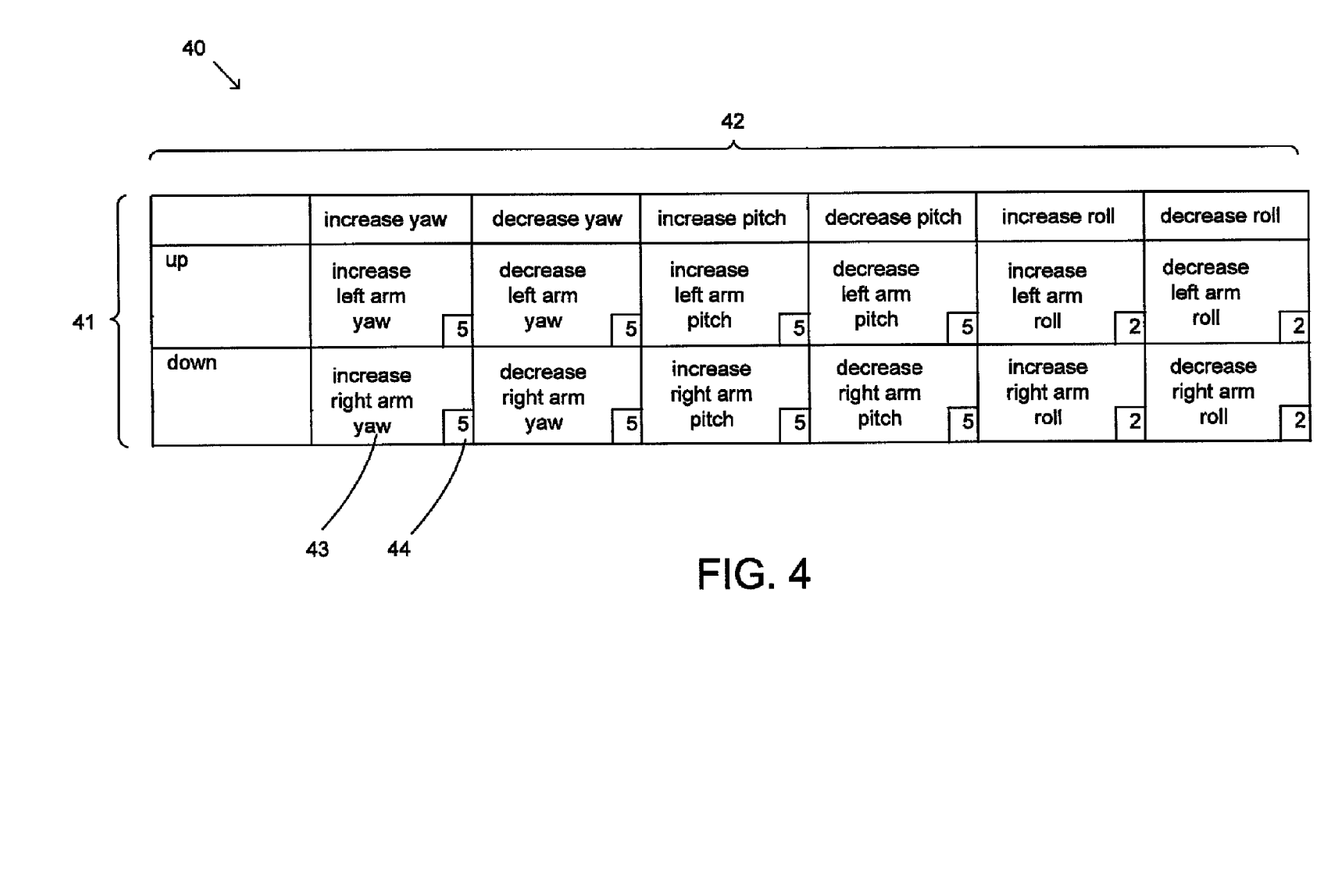
FIG. 4 illustrates a specific map for controlling an object via an input device according to one embodiment.

FIG. 4 illustrates a map 40 according to an embodiment of the present invention. The map 40 includes rows 41 each corresponding to one of the positions of the modal switch 4.

The map 40 also includes pairs of columns 42, where each pair of columns 42 corresponds to one of the degrees of freedom of the joystick 2. The map 40 comprises a plurality of cells 43, each cell provided at an intersection of a row and column. Each cell 43 includes a mapping of a position of the modal switch 4 and a change in a degree of freedom of the joystick 2 to a change in a degree of freedom of the object 6. Each cell 43 may also include a gain factor 44 for mapping a displacement of the joystick 2 to a rate or amount of change of the degree of freedom of the object 6.

In one embodiment, the rate or amount of change of the degree of freedom of the object 6 may have a 1:1 correspondence with a corresponding rate or amount of displacement of the joystick 2. In such an embodiment, gain factors may not be provided or a gain factor of one may be provided. Alternatively, as illustrated in FIG. 4, gain factors other than one may be provided, such as a gain factor of five. In this case, the rate or amount of change of the degree of freedom selected by the modal switch 4 has a 5:1 correspondence with a corresponding rate or amount of displacement of the joystick 2. Non-integer gain factors and gain factors between zero and one may also be provided.

The mapping of a position of the modal switch 4 to a subset of degrees of freedom of the object 6 and the mapping of the gain factor need not be provided in the same map. Rather, they could be provided in maps that are independent from one another.

The map 40 as shown in FIG. 4 may be used for a two position modal switch 4 and a joystick 2 having three degrees of freedom. The modal switch 4 may include an up position and a down position. The joystick 2 may have degrees of freedom including a yaw, pitch, and roll. In this embodiment, the map 40 is configured so that placing the modal switch 4 in the up position results in control of degrees of freedom of a left arm of a robot 30, and placing the modal switch 4 in the down position results in control of degrees of freedom of a right arm of the robot 30. Each degree of freedom of the joystick 2 is mapped to a corresponding degree of freedom of the left or right arm of the robot 30, depending on the position of the modal switch 4. Accordingly, when the modal switch 4 is placed in the up position and a yaw of the joystick 2 is changed, a yaw of the left arm of the robot 30 is changed. Increasing a yaw of the joystick 2 causes an increase in a yaw of the left arm of the robot 30.

Gain factors 44 are also provided for each cell 43. In this embodiment, a gain factor 44 of five is provided for changing a pitch or yaw of the left arm and right arm of the robot 30. Accordingly, when the modal switch 4 is placed in the up position and a yaw of the joystick 2 is displaced, a yaw of the left arm of the robot is displaced by a distance or a rate that is five times the amount of displacement of the joystick.

Figure 5:
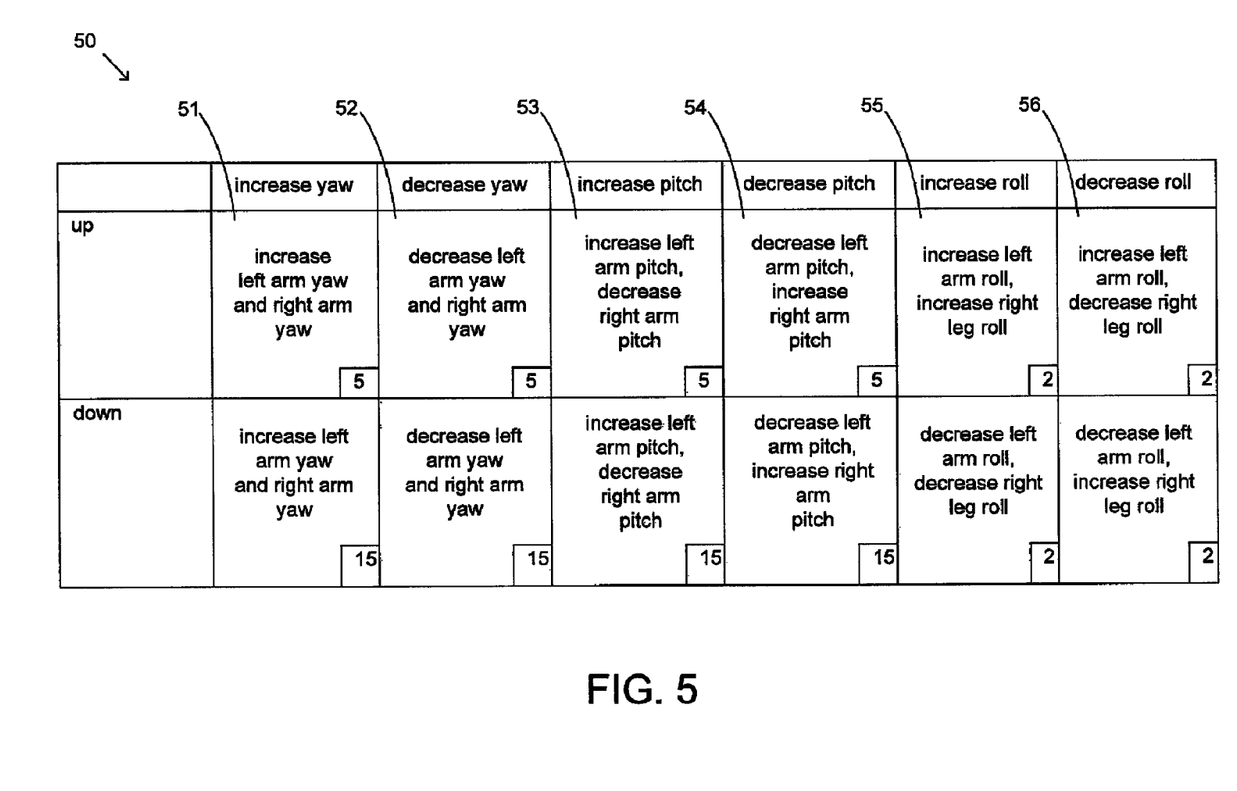
FIG. 5 illustrates a specific map for controlling an object via an input device according to another embodiment.

FIG. 5 illustrates a map 50 according to an embodiment of the present invention. The map 50 may be used for the input device 1 such as that used for the embodiment illustrated in FIG. 4. However, the mapped functions illustrated in the map 50 are different than those illustrated in map 40.

A degree of freedom of the joystick 2 may correspond to a plurality of degrees of freedom of the object 6. To facilitate such a correspondence, a mapping such as that provided by cells 51 to 56 may be used. In accordance with cells 51 to 56, placing the modal switch 4 in either the up or down position results in simultaneous control of both left and rights parts of the robot 30.

A change in a degree of freedom of the joystick 2 may correspond to a corresponding change in degrees of freedom of the object 6. For example, as illustrated in cell 51, placing the modal switch 4 in the up position and increasing a yaw of the joystick 2 results in a simultaneous increase in yaw of both the left arm and right arm of the robot 30. Similarly, as illustrated in cell 52, placing the modal switch 4 in the up position and decreasing a yaw of the joystick 2 results in a simultaneous decrease in yaw of both the left arm and right arm of the robot 30.

A change in a degree of freedom of the joystick 2 may correspond to different changes in degrees of freedom of the object 6. For example, as illustrated in cell 53, placing the modal switch 4 in the up position and increasing a pitch of the joystick 2 results in a simultaneous increase in pitch of the left arm and decrease in pitch of the right arm. Similarly, as illustrated in cell 54, placing the modal switch 4 in the up position and decreasing a pitch of the joystick 2 results in a simultaneous decrease in pitch of the left arm and increase in pitch of the right arm.

A change in a degree of freedom of the joystick 2 may correspond to identical or different changes in degrees of freedom for different parts of the object 6. For example, as illustrated in cell 55, placing the modal switch 4 in the up position and increasing a roll of the joystick 2 results in a simultaneous increase in roll of the left arm and increase in roll of the right leg. As illustrated in cell 56, placing the modal switch 4 in the up position and decreasing a roll of the joystick 2 results in a simultaneous increase in roll of the left arm and decrease in roll of the right leg.

The embodiment illustrated in FIG. 5 shows a single gain factor corresponding to each cell of the map 50. However, in accordance with embodiments of the present invention, multiple gain factors may correspond to each cell of the map 50. For example, when a plurality of degrees of freedom are provided in a single cell, a gain factor for each degree of freedom may also be provided. Moreover, the gain factors corresponding to a single cell or the gain factors in the entire map 50 may be the same or they may different from one another.

It should be noted that the maps illustrated in FIG. 4 and FIG. 5 are examples only and the invention is not so limited. For example, although these maps illustrate that a change in yaw of the joystick 2 corresponds to a change in yaw of a part of the robot 30, a change in yaw of the joystick 2 may similarly correspond to changes in other degrees of freedom such as a pitch and/or roll.

Figure 6:
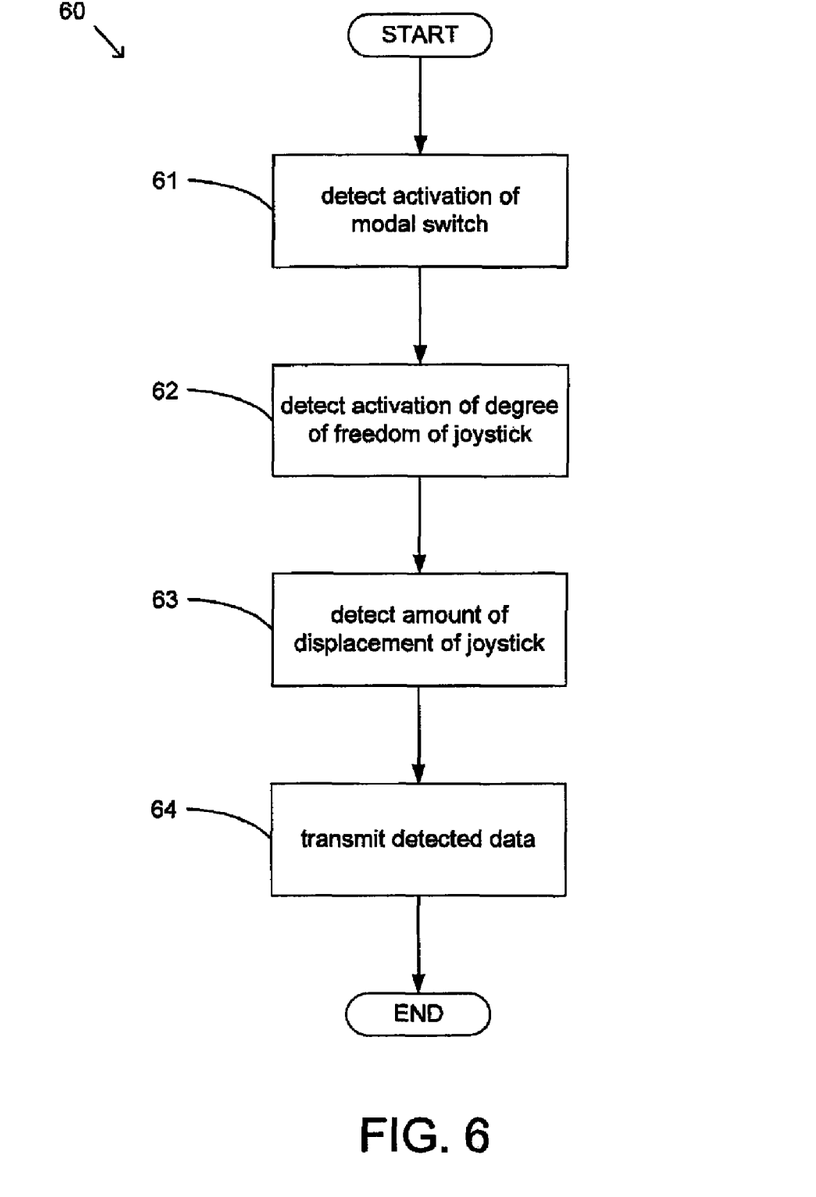
FIG. 6 is a flow diagram illustrating a method of communicating data from an input device for controlling an object.

FIG. 6 illustrates a method of communicating data from an input device 1 for controlling an object 6. Processing begins at step 61 where the input device 1 detects an activation of the modal switch 4. The detected activation indicates a selection of a subset of degrees of freedom of the object 6. This detection results from activation of a modal switch transducer. In step 62, the input device 1 detects activation of a degree of freedom of the joystick 2. This detection results from the activation of a joystick transducer. In step 63, the input device 1 detects the amount of displacement of the joystick 2 for the activated degree of freedom. This detection results from a value being output from the activated joystick transducer. In step 64, all of the detected information is communicated to the controller 20. Processing then terminates.

Figure 7:
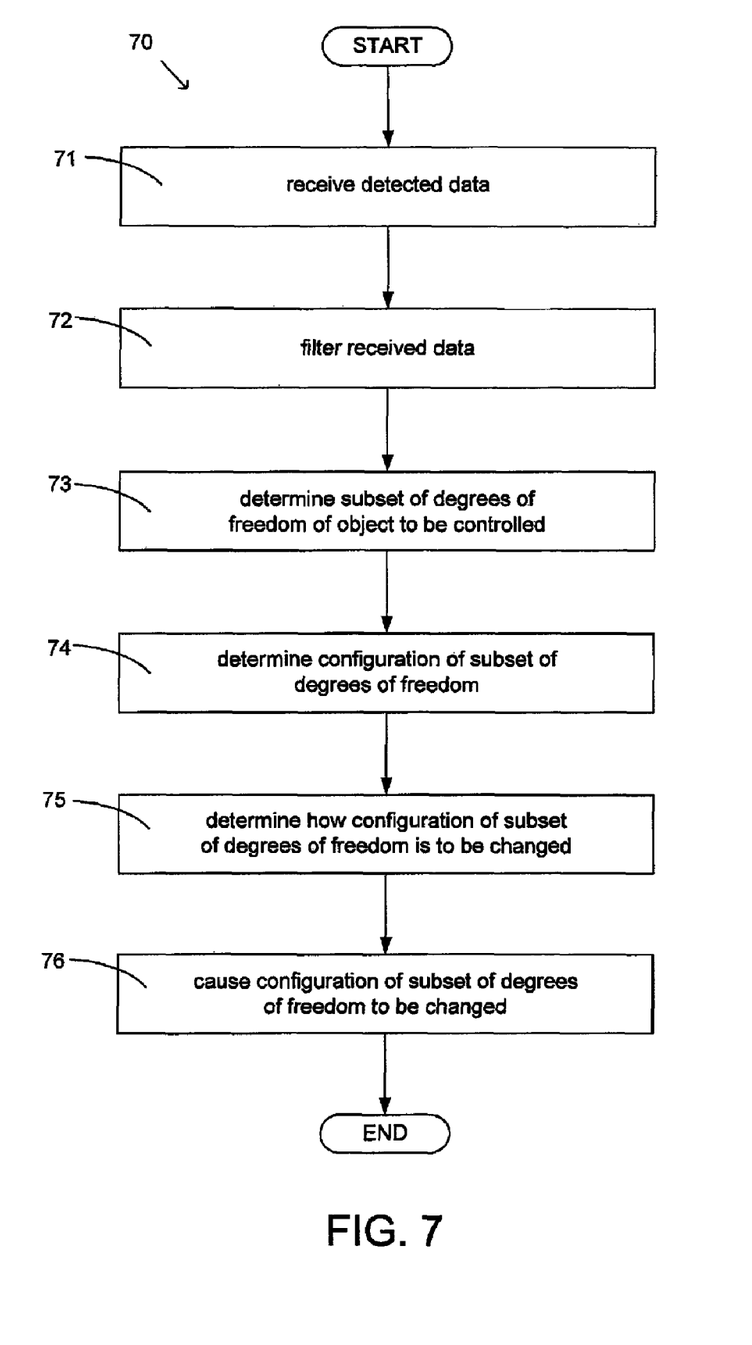
FIG. 7 is a flow diagram illustrating a method for controlling an object via an input device.

FIG. 7 illustrates a method of controlling an object 6 via an input device 1. The method may be performed by the processor 22 in the controller 20, recalling that the controller 20 may be provided in or separate from the input device 1 and object 6. Processing begins at step 71 where the processor 22 receives the detected data from the input device 1. In step 72, the information from the joystick transducers is filtered via the low pass filter 21.

In step 73, the subset of the degrees of freedom of the object 6 desired to be controlled by the user is determined. For this determination, the processor 22 compares the received information indicating the detected activation of the modal switch 4 to a map indicating a correspondence between each of the plurality of positions of the modal switch 4 and subsets of degrees of freedom of the object 6. Based on the comparison, the controller 20 determines the subset of degrees of freedom of the object 6 to be controlled. For example, the received information may indicate activation of the up position of the modal switch 4. By comparing this received information with the map 40, the controller 20 determines that the subset of degrees of freedom for the left arm of the object 6 is to be controlled.

In step 74, the configuration of the subset of degrees of freedom to be controlled is determined. The configuration may be determined by receiving configuration information from the object 6 or reading pre-stored configuration information.

In step 75, it is determined how the configuration of the subset of degrees of freedom to be controlled is to be changed. This determination may include the following steps. The processor 22 compares the information received from the input device indicating the detected activation of the degree of freedom of the joystick 2 to a map 40 indicating a correspondence between the degrees of freedom of the joystick 2 and the subset of degrees of freedom of the object 6. By comparing this received information with the map 40, the controller 20 determines a degree of freedom of the object 6 to be changed and whether the degree of freedom will be increased or decreased. For example, the received information may indicate an increased yaw of the joystick 2. By comparing this received information with the map 40, the controller 20 determines that the yaw of the left arm of the object 6 is to be increased.

In step 76, the configuration of the selected subset of degrees of freedom of the object 6 is caused to be changed. This may include the following steps. The desired rate or amount of change of the degree of freedom to be controlled is determined. The processor 22 determines whether there is a gain factor associated with the degree of freedom to be controlled. If it is determined that there is no gain factor or that the gain factor is equal to one, then the rate or amount of change of the joystick 2 may directly correspond to a rate or amount of change of the degree of freedom to be controlled. If it is determined that there is a gain factor, then the rate or amount of displacement of the joystick 2 may be multiplied by the gain factor before being used to control a rate or amount of change of the degree of freedom to be controlled.

Determining whether there is a gain factor associated with the degree of freedom to be controlled may include checking for the existence of a gain value in a map. Alternatively, determining whether there is a gain factor may include checking whether a flag has been set indicating the existence of a gain factor. Once it is determined that a gain factor exists, the value of the gain factor may be determined by reading the value corresponding to the degree of freedom to be controlled.

Once the desired rate or amount of change for the degree of freedom to be controlled is determined, the desired rate or amount of change may be added to the configuration of the degree of freedom to be controlled resulting in a new configuration of the degree of freedom to be controlled. The new configuration of the degree of freedom may then be sent to the object 6. Processing then terminates.

According to an embodiment of the present invention, an amount of change of a degree of freedom of the object 6 is controlled by displacement of the joystick 2. In this embodiment, the controller 20 may obtain information indicating a current configuration of the degree of freedom of the object 6. The controller 20 may then add the determined amount of change to the obtained information resulting in information indicating a desired change of the degree of freedom of the object 6. The information indicating a desired change may then be sent to the object 6, instructing the object 6 to change the degree of freedom by the desired amount.

According to an embodiment of the present invention, a rate of change of a degree of freedom of the object 6 is controlled by displacement of the joystick 2. In this embodiment, the controller 20 may obtain information indicating a current rate of change of the degree of freedom of the object 6. The controller 20 may then add the determined rate of change to the obtained information resulting in information indicating a desired rate of change of the degree of freedom of the object 6. The information indicating a desired rate of change may then be sent to the object 6, instructing the object 6 to change the degree of freedom at the desired rate of change.

According to an embodiment of the present invention, the object 6 may have associated therewith boundary conditions for the amount and/or rate of change of its degrees of freedom. The controller 20 may store such information in the storage device 23. In this case, before communicating the information indicating a desired change of the degree of freedom or communicating the information indicating a desired rate of change of the degree of freedom, the boundary conditions may be checked to determine whether the desired change or rate of change exceeds a predetermined distance from or proximity to the boundary conditions or exceeds a predetermined amount. In the case that the predetermined distance, proximity, or amount is not exceeded, the desired change or desired rate of change may be communicated to the object 6. In the case that the predetermined distance, proximity, or amount is exceeded, the desired change or desired rate of change may be modified so as to reduce the desired change or desired rate of change. Alternatively, processing regarding the boundary conditions may be performed by the object 6. In such a case, the desired change or rate of change is sent to the object 6 without modification.

The above description is illustrative but not restrictive. Many variations of the invention will become apparent to those skilled in the art upon review of the disclosure. For example, the controller 20 may be implemented within the input device 1, the object 6, or as a stand-alone unit. The object 6 may be a robot in the shape of a person having legs and arms; alternatively, the robot may have treads instead of legs. The scope of the invention should, therefore, be determined not with reference to the above description, but instead should be determined with reference to the pending claims along with their full scope of equivalents.

What is claimed is:

1. An input device for controlling an object, the input device comprising:
    a modal switch for selecting a subset of degrees of freedom of an object;
    a joystick having at least three degrees of freedom for controlling a change over time in a configuration of the selected subset; and
    a computer processor configured to apply a gain to the change over time and to alter the gain in response to proximity of the configuration of the selected subset to a boundary condition,
    wherein the change over time in the configuration of the selected subset is functionally dependent on both a motion of the joystick and a state of the selected subset.

2. The input device of claim 1, wherein the modal switch is located on the joystick.

3. The input device of claim 1, further comprising a map stored in a memory storage device, the map including data representing, for each modal switch selection, a relationship between changes to the degrees of freedom of the joystick and changes in the configuration of the selected subset.

4. The input device of claim 3, wherein the map includes, for each degree of freedom of the joystick, a corresponding change to a configuration of one of the degrees of freedom in the selected subset.

5. The input device of claim 1, wherein the computer processor is configured to reduce the gain to zero as the configuration of the selected subset approaches the boundary condition so that the change over time in the configuration of the selected subset reduces to zero as the configuration of the selected subset approaches the boundary condition.

6. The input device of claim 1, wherein the boundary condition is at least one of a condition detected by the computer processor, a condition calculated by the computer processor, a condition representative of a limit to one of the subset of degrees of freedom of the object, and a condition representative of a limit to a plurality of the subset of the degrees of freedom of the object.

7. The input device of claim 1, further comprising a switch that, when activated, causes a gain of zero to be applied to the change over time in the configuration of the selected subset so that the change over time in the configuration of the selected subset is equal to zero while the switch is activated.

8. The input device of claim 1, wherein the modal switch simultaneously selects more than one degree of freedom of the object and the joystick simultaneously controls a change over time in the configuration of the more than one degree of freedom of the object.

9. The input device of claim 1, wherein the object is a physical robot or a virtual character.

10. The input device of claim 1, wherein the subset of the degrees of freedom of the object comprises motions of parts of the object and a change over time of the motions is a function of motion of the joystick.

11. The input device of claim 1, wherein the subset of the degrees of freedom of the object comprises a color of a part of the object and a change over time of the color is a function of motion of the joystick.

12. The input device of claim 1, wherein the subset of the degrees of freedom of the object comprises a texture of a part of the object and a change over time of the texture is a function of motion of the joystick.

13. A method for controlling an object via an input device having a joystick and a modal switch, the method comprising:
    receiving, using a computer processor, from the input device, a first input indicating a selection by the modal switch of a subset of degrees of freedom of an object;
    receiving, using the computer processor, from the input device, a second input indicating a motion of the joystick;
    causing, using the computer processor, a change over time in a configuration of the selected subset based on the motion of the joystick and a state of the selected subset;
    causing a first selected part of the object to be displaced including:
        a) determining whether the configuration of the selected subset is approaching a boundary condition; and
        b) if the computer processor determines that the configuration of the selected subset is approaching the boundary condition, reducing a gain applied to the change over time in the configuration of the selected subset to zero so that the change over time in the configuration of the selected subset reduces to zero as the configuration of the selected subset approaches the boundary condition.

14. The method of claim 12, wherein causing a change over time in a configuration of the selected subset includes:
    comparing the second input to a map, the map including data representing, for each modal switch selection and for each degree of freedom of the joystick, a relationship between changes to the degree of freedom of the joystick and changes in a configuration of one of the degrees of freedom in the selected subset.

15. The method of claim 13, wherein the boundary condition is at least one of a condition detected by the computer processor, a condition calculated by the computer processor, a condition representative of a limit to one of the subset of degrees of freedom of the object, and a condition representative of a limit to a plurality of the subset of the degrees of freedom of the object.

16. The method of claim 13, further comprising:
in response to activation of a switch, causing a gain of zero to be applied to the change over time in the configuration of the selected subset so that the change over time in the configuration of the selected subset is equal to zero while the switch is activated.

17. The method of claim 13, wherein the modal switch simultaneously selects more than one degree of freedom of the object and the joystick simultaneously controls a change over time in the configuration of the more than one degree of freedom of the object.

18. The method of claim 13, wherein the object is a physical robot or a virtual character.

19. The method of claim 13, wherein the subset of the degrees of freedom of the object comprises motions of parts of the object and a change over time of the motions is a function of motion of the joystick.

20. The method of claim 13, wherein the subset of the degrees of freedom of the object comprises a color of a part of the object and a change over time of the color is a function of motion of the joystick.

21. The method device of claim 13, wherein the subset of the degrees of freedom of the object comprises a texture of a part of the object and a change over time of the texture is a function of motion of the joystick.

22. A computer program product having a non-transitory computer readable medium storing a set of code modules which, when executed by a processor of a computer system, cause the processor to control an object via an input device having a joystick and a modal switch, the computer program product comprising:
code for receiving, from the input device, a first input indicating a selection by the modal switch of a subset of degrees of freedom of an object;
code for receiving, from the input device, a second input indicating a motion of the joystick;
code for causing a change over time in a configuration of the selected subset based on the motion of the joystick and a state of the selected subset;
code for causing a first selected part of the object to be displaced, comprising:
a) code for determining whether the configuration of the selected subset is approaching a boundary condition; and
b) code for reducing, if the processor determines that the configuration of the selected subset is approaching the boundary condition, a gain applied to the change over time in the configuration of the selected subset to zero so that the change over time in the configuration of the selected subset reduces to zero as the configuration of the selected subset approaches the boundary condition.

* * * * *